Oct. 14, 1969    H. A. PRICE ET AL    3,472,498
AIR POLLUTANT INCINERATION

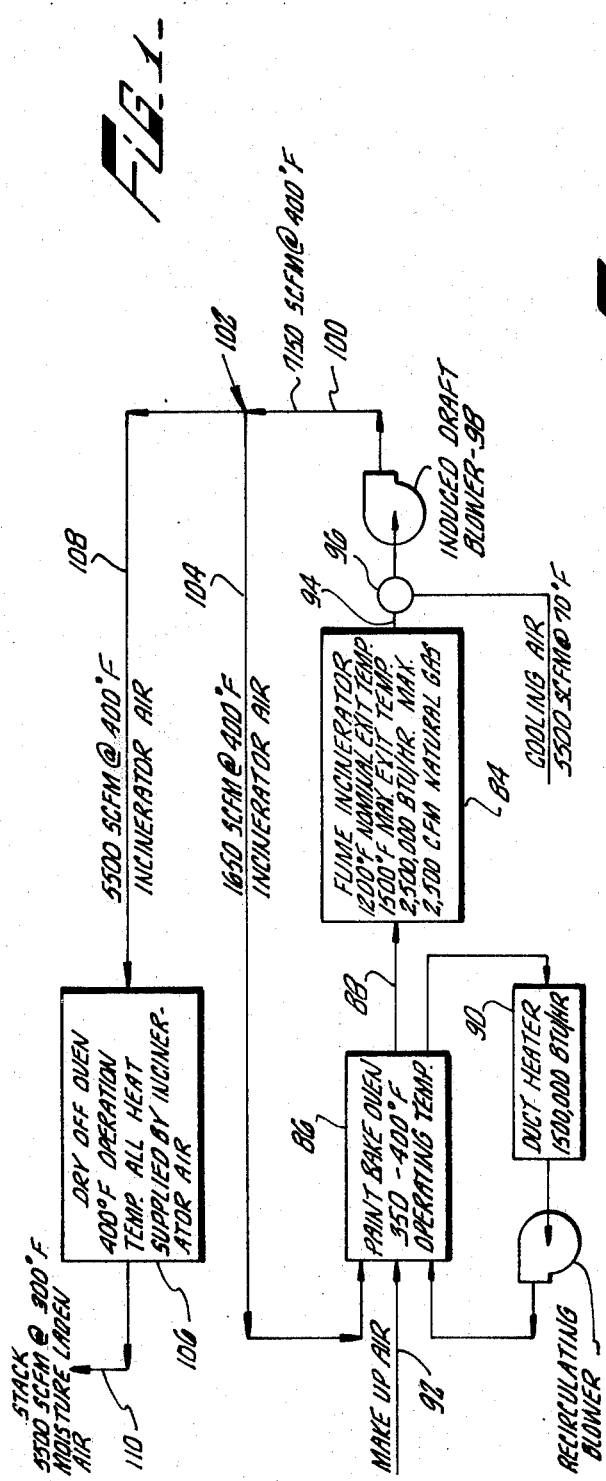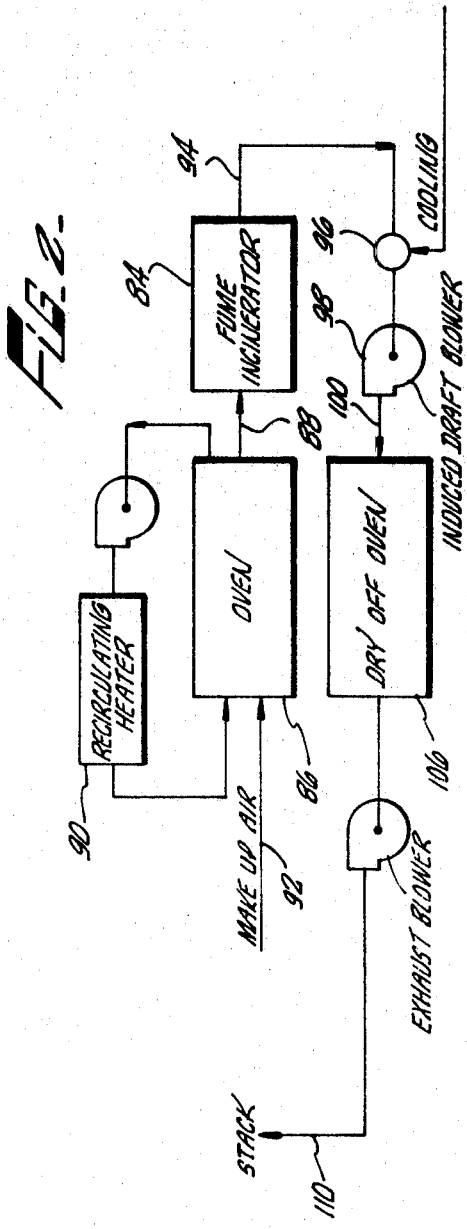

Filed Dec. 8, 1967    3 Sheets-Sheet 2

INVENTORS.
HAROLD A. PRICE
DONALD A. PRICE
BY
Christie, Parker & Hale
ATTORNEYS

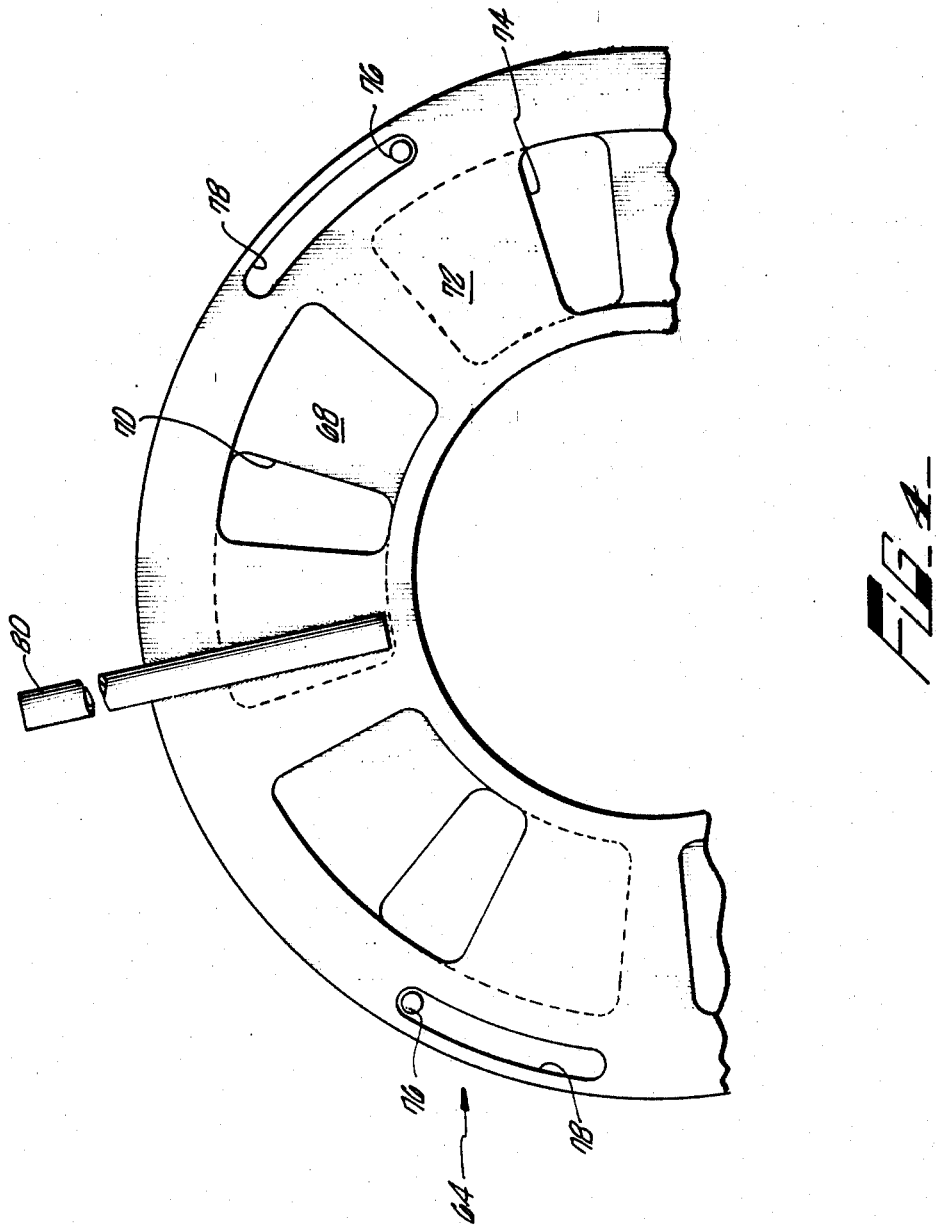

United States Patent Office 3,472,498
Patented Oct. 14, 1969

3,472,498
AIR POLLUTANT INCINERATION
Harold A. Price and Donald A. Price, Orange, Calif., assignors to Gas Processors, Inc., Brea, Calif., a corporation of California
Filed Dec. 8, 1967, Ser. No. 689,198
Int. Cl. F27b 3/02; F23g 7/06
U.S. Cl. 263—40
8 Claims

ABSTRACT OF THE DISCLOSURE

A waste gas incineration system for preventing the discharge into the atmosphere of oxidizable waste particles in exhaust gases of ovens. Exhaust gases are introduced into a combustion chamber of an incinerator where they are mixed with a combustible gas and ignited. The gases are retained in the combustion chamber sufficiently long to assure substantially complete incineration of all waste particles. An impeller withdraws the waste gases from the chamber. Ports are provided for mixing the gases with ambient air to reduce the temperature of the air and gas mixture. The air-gas mixture is transported to locations where heat or thermal energy is required.

BACKGROUND OF THE INVENTION

Field of the invention

This invention relates to systems for the incineration of combustible waste products contained in exhaust gases discharged into the atmosphere. Although the system of this invention can be employed in conjunction with any exhaust discharging apparatus it is particularly well suited for use with drying ovens where various volatile materials are removed from articles in the oven.

State of the prior art

At the present wide areas, and particularly metropolitan centers, experience a high degree of air pollution. In some areas the extent of the pollution has or is about to reach a level where it represents a health hazard.

Principal sources of air pollution are exhaust gases and fumes developed by internal combustion engines of automobiles. Air pollutants discharged by industrial concerns, however, often contaminate the atmosphere to an equal degree and, in areas of industrial concentration, to even a greater degree than automobiles. Generally it can be said that the source of industrial pollutants are incomplete combustion products from heat generating processes and the discharge of combustible solvents which have been evaporated. One of the most common applications of the latter is found in painting processes where paints are dried by baking or the like to leave a thin film of pigment on the article being painted.

Evaporated solvents, particularly hydrocarbons, represent one of the most undesirable air pollutants. When subjected to elevated temperatures and sunlight, these pollutants create an eyestinging haze commonly referred to as smog.

To counter the problem of air pollution a number of attempts have been made in the prior art to prevent potentially polluting particles from being discharged into the atmosphere. In industrial applications evaporated solvents are, according to the prior art, subjected to a sufficient heat to incinerate them. By incineration, organic pollutants, which are by far the majority of all pollutants, are chemically changed into water ($H_2O$) and carbon dioxide ($CO_2$).

Prior art incineration systems employ combustion chambers into which the exhaust gases containing the evaporated solvents are discharged. There they are subjected to high temperature flames, most commonly fed by natural gas, and thoroughly mixed therewith. To incinerate the majority of the pollutants the exhaust gases are retained in the heated zone for a minimum length of time. At the present the required time is considered to be at least 0.3 second.

The volume of air that is exhausted from the ovens is very large. For example, in a paint drying oven it takes approximately ten thousand standard cubic feet (S.C.F.) of air for each gallon of a common paint solvent that must be evaporated. In large operations the amount of solvent that must be evaporated often reaches several gallons a minute. This air volume must be heated to such temperature as will assure a nearly complete incineration of the evaporated solvent or waste particles in the exhaust air. The incineration temperature for exhaust air including hydrocarbons is a minimum of about 1,200° F. As a safety factor systems are designed to operate at 1,500° F. The required thermal energy to raise the temperature of the exhaust gases to between 1,200° F. and 1,500° F. is substantial and, for a system wherein no more than about one-half gallon of solvents is evaporated a minute, it is in the neighborhood of 4,680,000 B.t.u. (British thermal units) an hour. For larger systems the heat requirement is correspondingly greater.

The economic cost is substantial, particularly when considering the continuous operation of these systems. For the most part the thermal energy contained in the hot gases is discharged into the atmosphere and, therefore, economically lost. Although it has been suggested to use the hot gases in an economic manner as, for example, by introducing them into heat exchangers, this has on the whole not significantly reduced the high cost of incinerating air pollutants. A main reason is the relatively high temperature of the gases which makes them difficult to handle and a relatively large pressure drop in the combustion chamber of the incinerator.

In the combustion chamber the exhaust gases are thoroughly mixed into an already existing gas flame by injecting them into the flame in, for example, a tangential manner or by mechanically agitating the flame and the exhaust gases. The great amount of turbulence causes pressure drops across the combustion chamber which are normally as high as several inches of $H_2O$. To introduce these hot gases into a heat exchanger a blower is generally necessary. The temperature of the gas and its volume make the blower very large and expensive to construct. Moreover, it is subjected to such high temperatures that failure of portions of the blower, commonly its blades, is frequent.

Thus, the high cost of building and maintaining the blower, together with its frequent failures, has made it more attractive for industry to simply discharge the hot gases into the atmosphere through relatively tall stacks. The lack of a satisfactory, inexpensive incineration system has therefore increased the cost of maintaining or regaining a non-polluted air in our metropolitan centers. What is perhaps more serious, its high cost has prevented many from installing an incineration system. These industries continue to discharge the health impairing pollutants into the atmosphere.

SUMMARY OF THE INVENTION

Briefly, the present invention provides a method for incinerating combustible waste products from ovens and the like to prevent their discharge into the atmosphere. In accordance with the present invention exhaust gases from the oven are collected and their temperature is raised to a sufficient level to incinerate the waste products therein. After their incineration the gas is cooled to a temperature at which it can be economically handled by transport means such as a blower. Heat and thermal energy stored in these gases is then suitably utilized before the gases are finally discharged into the atmosphere.

In its preferred embodiment this method contemplates the mixing of the exhaust gas with a combustible gas, such as natural gas, to a level just above the lower explosive limit for the mixture. Thereafter the mixture is capable of continuously sustaining a flame. Turbulent mixing action is not required and the pressure drop across an incineration chamber in which the incineration of the exhaust gases takes place is substantially less than in comparable prior art chambers.

The heated gas discharged by the incinerator is cooled by preferably mixing it with an adequate quantity of air at ambient temperature. Thereafter a blower propells the air and gas mixture to a location where thermal energy in the mixture is required and can be utilized. The relatively small pressure drop across the combustion chamber together with the substantially lower temperatures of the mixture permit a highly economical construction and operation of the blower.

Although the air-gas mixture can be employed in any convenient manner as, for example, in a heat exchanger, a preferred embodiment of this invention contemplates a division of the mixture into two streams. One of the streams recirculates a part of the mixture to the oven which originally discharged the exhaust gas. For example, this may be a paint baking oven. The quantity of heat that must be introduced into the baking oven is thereby substantially reduced.

The other stream is introduced into a so-called dry-off oven wherein articles to be painted and baked in the baking oven are subjected to heat to remove all moisture therefrom. No separate heat generating source for the dry-off oven is required. Additionally, surface oxidation of the articles in the dry-off oven is reduced since the air-gas mixture to which they are subjected has a substantially lesser percentage of free oxygen than ordinary air.

In terms of apparatus the present invention provides an incinerator defining an elongated, tubular combustion chamber which has an intake, an outlet, and a length substantially greater than a maximum linear dimension of its cross-section adjacent the intake. First tubular conduit means fluidly connect the inlet with an exhaust side of an oven. Burner means adjacent the inlet mix exhaust gases from the oven with a combustible gas and ignite the mixture. Impelling means withdraw gases from the chamber after an air intake between the two mixes air with the gas to reduce the temperature of the resulting air-gas mixture. From the impelling means the mixture is transported to a location where its heat and thermal energy can be economically utilized.

The combustion chamber is proportioned such that a pressure differential between the intake and the outlet of the incinerator is no more than between about one-half to three quarter inch $H_2O$. In addition the chamber is constructed to retain the exhaust gases therein for at least about 0.3 second. A substantially complete incineration of all waste particles contained in the oven exhaust gases is thereby assured.

This apparatus is economical to construct because its component parts are relatively simple and small. No specially designed burner means which are constructed to induce turbulence, as was necessary in the past, are required. The movement of the exhaust gas as well as the combustible gas continues to be relatively smooth. The reduced temperature of the gas and air mixture at the impeller enables it to be constructed substantially smaller than comparable prior art impellers. More importantly however, the impeller is not subjected to high temperatures which require it to be constructed of expensive, heat resistant materials and which nevertheless cause their frequent failures.

As contrasted with comparable prior art incinerating apparatus, one constructed in accordance with the present invention can be installed at lower costs. Added thereto must be the continuous savings while incinerating the exhaust gases in accordance with the method of the present invention. Altogether, therefore, this invention enables the prevention of air pollution from the industrial discharge of polluting particles at substantial cost. In addition, its economics are an inducement to all industrial concerns for adding incineration systems to their operation to help reduce and ultimately eliminate the air pollution problem.

BRIEF DESCRIPTION OF THE DRAWINGS

FIG. 1 is a schematic flow sheet of an industrial exhaust gas incineration system constructed in accordance with the present invention;

FIG. 2 is a schematic flow sheet of the same incineration system shown in FIG. 1 but where it is differently applied;

FIG. 4 is a fragmentary view, in section, taken along line 4—4 of FIG. 3.

DESCRIPTION OF THE PREFERRED EMBODIMENTS

Figure 3:
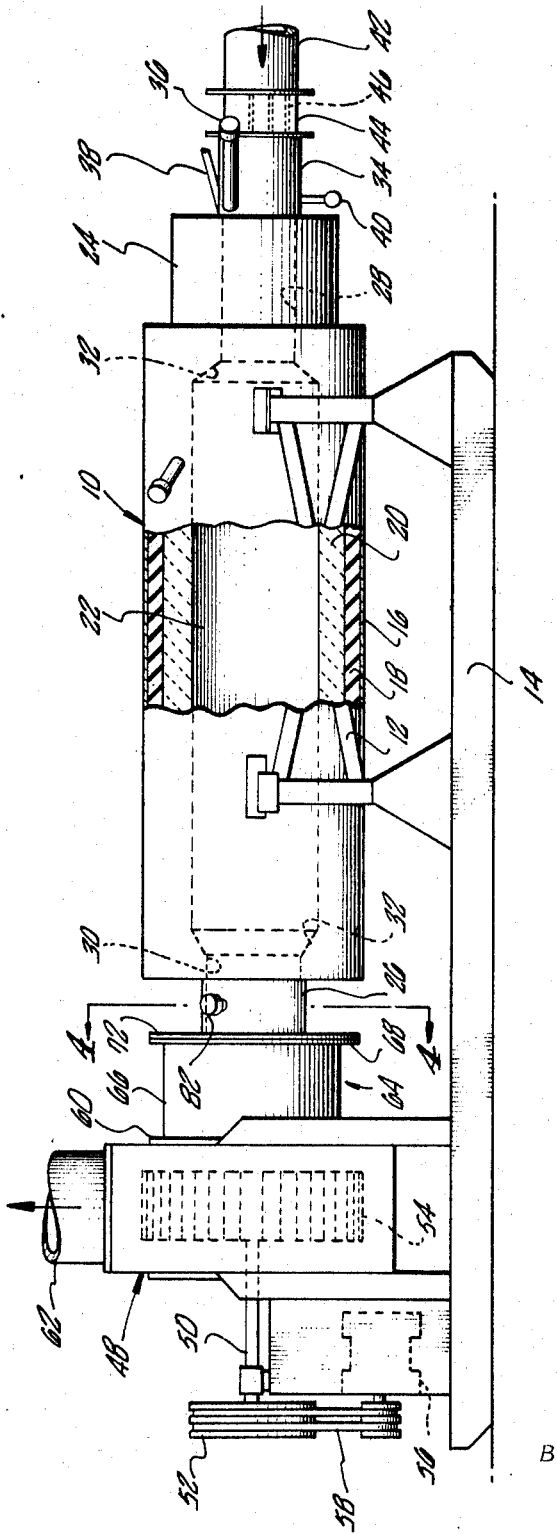
FIG. 3 is an elevational view, with parts broken away, of an incinerator constructed in accordance with the present invention.

Initially referring to FIG. 3, an incinerator 10 is carried on a support structure 12 which is disposed on a skid 14. The skid is mounted at a suitable location within a building structure (not shown) or, if preferred, exteriorly of any buildings.

The incinerator is constructed of a tubular metal conduit 16, a layer of insulating material 18 on the inner side of the conduit and a layer of refractory material 20 of a suitable thickness to prevent the transmission of excessive heat to the conduit. The refractory material defines an elongated combustion chamber 22 having an intake 24 and an outlet 26. Preferably the combustion chamber has a circular cross-section (not shown). For purposes to be more fully described hereinafter, it has a length between about five to about thirteen times the diameter of an end portion 28 adjacent the intake. Portion 28 as well as an end portion 30 adjacent the outlet of the chamber are of a reduced diameter; the outlet end portion having a cross-section greater than that of the inlet end portion. A transitional section 32 between the end portions and the center portion of the chamber is tapered at an angle between about 15° and about 60°, preferably about 30°, to the axis of the chamber.

The intake end portion 28 is longer than its maximum transverse dimension or diameter to facilitate the incineration of the air pollutant as more fully set forth below. Preferably, its length is about 1.5 to 3.5 times its diameter.

A conventionally constructed gas burner 34 has an inner diameter equal to that of the inlet end portion 28. It includes a viewing port 36, a flame sensor 38, and a gas burner assembly 40, all projecting from an exterior of the burner through its wall into its interior. The gas burner 34 has a generally cylindrical configuration and is at its end opposite from the incinerator 10 connected with sections of pipe 42 fluidly connecting it with an oven (not shown in FIG. 3). If a section of the pipe adjacent the gas burner is a knee piece and exhibits a substantial amount of curvature a straightening section 44 is interposed between the burner and the pipe. The straightening section includes a plurality of axially oriented webs 46.

They reduce turbulence and the effects of centrifugal forces of the streaming gas which would disturb its equal distribution throughout the full cross-section of the gas burner 34. Although the gas burner may be of any suitable construction, one which is especially well adapted for this application is shown in U.S. Patent 3,037,553, issued on June 5, 1962.

A blower 48 is mounted on the skid 14 adjacent the outlet 26 and includes a horizontal shaft 50 mounting a sheave 52 adjacent its free end. An impeller 54 is mounted on the other end of the shaft 50. An electric motor 56 is coupled with the sheave by belts 58 and rotates the impeller. An intake side 60 of the blower communicates with the outlet 26 of the incinerator 10. When the impeller rotates gas is withdrawn from the combustion chamber 22 and discharged into suitable pipes 62 mounted adjacent the discharge side of the blower.

Referring to both FIGS. 3 and 4, an air induction apparatus 64 is disposed between the intake 60 of the blower and the outlet 26 of the incinerator. It comprises a cylindrical section 66 which has a diameter substantially greater than the diameter of the outlet 26. The cylindrical section has a length less than a distance between the blower and the incinerator and includes a radial end wall 68 connecting the cylindrical section 66 with the outlet 26 of the incinerator. The end wall includes a plurality of equally spaced, annularly arranged port holes 70 which communicate the inner portions of the cylindrical section with the exterior thereof. A ring-shaped cover 72 has an inner diameter slightly greater than the outer diameter of the outlet 26, an outer diameter equal to that of the cylindrical section 66, and a plurality of port holes 74 which have a configuration and a spacing equal to that of port holes 70 in the end wall 68. The end wall includes axially disposed bosses 76 which engage elongated slots 78 in the cover 72. A handle 80 is provided for rotating the cover relative to the end wall as confined by the bosses and the slots. When the bosses are adjacent one end of the slots the apertures 74 in the cover are aligned with those in the end wall. As the relative position of the bosses and the slots is changed the port holes in the cover and end wall become increasingly misaligned, thereby increasing restricting the free area between the interior of the cylindrical section 66 and the exterior thereof. Means (not shown), such as a threaded bolt, for securing the cover to the end wall in a fixed position are also provided. When the means are tightened relative movements between the end wall and the cover are prevented, thereby assuring a constant free area between the interior and the exterior of the air induction apparatus.

The incinerator 10, the blower 48, and the air induction apparatus 64, are installed between pipes 42 and 62, through which exhaust gases from an oven (not shown in FIGS. 3 or 4) are transported. The exhaust gases contain oxidizable, non-combusted waste particles such as hydrocarbons, for example, which, if they were discharged into the atmosphere, would cause undesirable air pollution. The polluting waste particles are incinerated in the combustion chamber 22 of the incinerator. It operates as follows:

Exhaust gases from the oven enter the gas burner 34 and are there subjected to and mixed with a supply of combustible gas such as natural gas. The amount of gas supplied is closely controlled and balanced and is at least enough to yield a mixture which is at or just above its lower explosive limit. This means that if ignited the mixture is capable of sustaining a flame without additional heat from exterior sources. The amount of natural gas must further be sufficient to increase the temperature of the mixture to between about 1,200° F. and 1,500° F. after it has been ignited. For this purpose a temperature sensor 82 is connected with a modulating natural gas supply control valve (not shown) which regulates the gas supply to maintain a constant temperature in the combustion chamber 22.

In the burner the mixture is ignited and in its ignited state propagates through portion 28 towards the combustion chamber 22. In the intake end portion 28 the flame is highly concentrated and expands into intimate contact with the walls defining the intake end portion. Exhaust gases which bypassed the gas burner assembly 40 disposed in the center of the burner 34 and which might not be mixed with a sufficient amount of natural gas are thereby subjected to the high temperatures of the explosion-like flame in the portion 28. To assure this incineration in the end portion 28 its length is greater than its diameter. The flame is thereby given enough time to expand into contact with the walls before the gas mixture is allowed to expand into the chamber 22.

Upon entering the chamber the burning gas mixture expands. This expansion induces a gentle rolling action of the mixture and brings boundary layers of gas not yet incinerated from adjacent the walls of portion 28 into contact with the flame. Additionally, a slight turbulence induced by the transitional section 32 adjacent the outlet end portion 30 assures incineration of any waste particles still present in the gas mixture. A substantially complete incineration of all waste particles within incinerator 10 is thereby obtained.

The reduced cross-sectional area of the outlet also increases the velocity of the gas stream, thereby reducing its pressure. A resulting pressure differential between the outlet and the portion of the chamber adjacent the outlet facilitates the withdrawal of the hot gases from the chamber.

Experience has shown that it is desirable to maintain the waste particles within the combustion chamber for at least about 0.3 second. To maintain a steady combustion within the chamber together with a sufficient amount of turbulence to assure an even heat and combustion distribution, the speed of the gas stream through the chamber should not exceed about 2,000 feet per minute, preferably between about 1,500 feet and about 1,700 feet per minute. Greater speeds increase turbulence and the resulting pressure drop across the chamber. Selecting these two parameters plus the known quantity of exhaust gases from the oven the diameter as well as the length of the combustion chamber can be calculated.

Considering the actual combustion chamber to extend from the end of the intake end portion 28 adjacent the gas burner 34 to the end of the transitional section 32 adjacent the outlet end portion 30, the length of the chamber will then be between about five to about thirteen times the diameter of the intake end portion. Best results with respect to completeness of incination of the air polluting particles and minimization of the pressure drop across the chamber have been obtained with chambers wherein the ratio between their actual length and their intake end portion diameter is between about eight to about ten, preferably about nine.

Best results have further been obtained with an incinerator wherein the outlet 26 has a diameter which is about the mean between the diameter of the center portion of the chamber and the diameter of the intake end portion 28 adjacent the gas burner 34. On the average this mean is about 0.7 the diameter of the center portion of the chamber.

As the gas mixture progresses through the chamber it is pulled into the air induction apparatus 64 and the blower 48 by the vacuum created by the impeller 54. The absolute pressure of the system as a whole as well as the velocity of the gas mixture in the outlet portion 30 creates a vacuum at the outlet 26 and the air induction apparatus 64 as compared to the atmosphere. Ambient air is thereby drawn into the stream through the port holes 70 and 74 in the end wall 68 and the cover 72. The port holes are sized to permit the induction of a sufficient amount of air to reduce the temperature of the gas and air mixture to levels easily withstood by the impeller without having to construct it of special, high cost material. In a typical operating example wherein the average temperature within the combustion chamber 22 is about 1,200° F. enough air is drawn into the stream to reduce its temperature adjacent the impeller to about 500° F. On the average the volume of air required to cool the gas mixture is about 1.2 to about three times the volume of gas mixture withdrawn from the incinerator. The precise volume, of course, depends on the exact gas mixture discharge temperature and the desired temperature of the air-gas mixture which may be more or less than 500° F.

The port holes are arranged annularly about the axis of the cylindrical section 66 and the impeller 54. They are equally distributed and assure cooling action of all portions of the withdrawn gas mixture. Overheating of and possible damage to portions of the impeller from being subjected to considerably higher gas temperatures due to an inadequate mixture of cold air and hot gas is thereby prevented.

To assure a constant temperature of the air-gas mixture discharged by the impeller the cover 72 of the air induction apparatus 64 may be coupled with a suitable control mechanism (not shown) to automatically adjust the openings through which air can be drawn into the gas stream. Under generally prevailing operating conditions however, this is not necessary since the variations in the gas stream and its temperature are small.

Referring to FIG. 1, installation of the incinerator 10 shown in FIG. 3 is schematically illustrated. An incineration unit 84 is fluidly connected with the discharge side of an oven 86, such as a paint bake oven for example, by suitable conduits 88. A conventional duct heater 90 is connected with the oven and circulates heated air therethrough. If required, ambient air may enter the oven at 92.

Exhaust gases discharged by the oven contain evaporated paint solvents, generally a plurality of hydrocarbons. These waste particles are incinerated in the incineration unit 84 and the hot gas is discharged at the outlet 94 of the unit. There it is mixed with cooled air at 96, introduced into a blower 98 and discharged into conduits 100. A properly sized T-section 102 diverts a portion of the gas stream discharged by the blower into a recirculation line 104. The cooled gas stream entering the recirculation line may have a temperature of about 400° F. and is reintroduced into the bake oven 86, there heating the atmosphere in the oven and reducing the amount of heat that must be supplied by the duct heater 90.

The remainder of the gas stream is transported to a dry-off oven 106 through a pipe line 108 and upon leaving the oven it is discharged into the atmosphere through a stack 110. As briefly alluded to earlier, in painting operations it is particularly advantageous to use gas discharged by the incinerator for removing moisture from articles which are subsequently to be painted. The low oxygen content of the gas reduces surface oxidation of the articles. The dry-off oven can, of course, be replaced with any other oven, heat exchanger (not shown), etc. where heat and thermal energy is required.

Referring to FIG. 2, another embodiment of this invention is shown. It is substantially similar to that shown in FIG. 1 with the exception that no gases discharged by the blower 98 are returned to the oven 86. Instead all of the gases discharged are introduced into the dry-off oven 106 and, through the stack 110 into the atmosphere.

Depending upon the particular application more or less of the cooled gas and air mixture discharged by the blower 98 are returned to the paint baking oven 86. In the alternative, as shown in FIG. 2, none of that mixture is returned to the bake oven and its heat and thermal energy is elsewhere utilized. In either case the advantages of this invention, namely the substantial lesser installation costs for an exhaust gas waste particle incineration system, together with its low operating costs are realized. At the same time pollution of the atmosphere is avoided.

To assure proper operation of the incineration system and to positively prevent the discharge of any air pollutants into the atmosphere conventional interlocking control devices (not shown) can be provided. They interrupt the operation of all units, including the duct heater 90, upon failure of one component of the incinerator. Start-up of the system is only possible after the reason for the failure has been repaired.

We claim:
1. A method for incinerating combustible waste products including hydrocarbons from ovens and the like to prevent their discharge into the atmosphere, the method comprising the steps of:
   (a) collecting exhaust gases from the oven;
   (b) mixing the exhaust gases with an amount of combustible gas sufficient to ignite the resulting mixture and raise the temperature of the ignited mixture to a level sufficient to incinerate the waste products in the exhaust gases;
   (c) continuously burning the mixture in an incineration chamber at about the rate it is introduced into the chamber;
   (d) withdrawing the mixture from the chamber after substantially all oxidizable waste products have been incinerated;
   (e) cooling the mixture withdrawn from the chamber; and
   (f) transporting the cooled gas to the heat and thermal energy of the mixture.

2. A method according to claim 1 wherein the mixture is cooled by adding ambient air thereto after it is withdrawn from the chamber.

3. A method according to claim 2 wherein a portion of the discharged mixture is recirculated to the oven.

4. A method for incinerating combustible waste products from ovens and the like to prevent their discharge into the atmosphere, the method comprising the steps of:
   (a) collecting exhaust gases from the oven;
   (b) raising the temperature of the exhaust gases to a level sufficient to incinerate the waste products;
   (c) cooling the gas by mixing it with ambient air in a chamber;
   (d) moving the cooled gas by means of an impeller to a location where the heat and thermal energy stored in the gas is utilized; and
   (e) said ambient air being injected through ports annularly arranged as to the chamber so that the impeller is cooled by the air.

5. Apparatus for incinerating combustible waste particles from ovens and the like to prevent their discharge into the atmosphere, the apparatus comprising:
   (a) an incinerator having an elongated, tubular combustion chamber having an intake and an outlet, the cross-sectional area of the chamber being greater than the cross-sectional area of either the intake or outlet, and the cross-sectional area of the outlet being less than the cross-sectional area of the chamber and greater than the cross-sectional area of the intake so that a back pressure of no more than about three-quarters of an inch of water is produced upon flow of exhaust gases through the apparatus;
   (b) first tubular conduit means adjacent the intake for transporting exhaust gases from the oven to the incinerator;
   (c) burner means adjacent the intake for mixing the exhaust gases with a combustible gas;
   (d) impelling means in flow communication with the outlet for withdrawing gases from the chamber and propelling the gases to a location where their heat and thermal energy can be economically utilized; and
   (e) air intake means between the chamber and the impelling means for mixing the gases withdrawn from the chamber with air to reduce the temperature of the air-gas mixture at the impeller.

6. Apparatus according to claim 5 wherein the impelling means include a blower and the air intake means include at least one annularly arranged opening substantially coaxial with the blower such that ambient air is drawn into the stream of gases from the chamber parallel to that stream whereby the blower is maintained at a temperature which is less than the temperature of the gases withdrawn from the chamber.

7. Apparatus according to claim 6 including a plurality of spaced-apart openings for mixing ambient air with the gases withdrawn from the chamber and including means for regulating the flow of air into said gas stream.

8. Apparatus according to claim 7 including second conduit means connected with the impelling means for recirculating a portion of the gas-air mixture to the oven.

References Cited
UNITED STATES PATENTS

| | | |
|---|---|---|
| 1,839,879 | 1/1932 | Hyatt. |
| 2,750,680 | 6/1956 | Houdry et al. _____ 263—3 X |
| 963,667 | 7/1964 | Great Britain. |

JOHN J. CAMBY, Primary Examiner

U.S. Cl. X.R.

23—277; 110—8; 431—5

PO-1050
(5/69)

UNITED STATES PATENT OFFICE
CERTIFICATE OF CORRECTION

Patent No. 3,472,498      Dated Oct. 14, 1969

Inventor(s) Harold A. Price and Donald A. Price

It is certified that error appears in the above-identified patent and that said Letters Patent are hereby corrected as shown below:

Col. 5, line 42, "increasing" should read --increasingly--

Col. 6, line 50, "incination" should read --incineration--

Col. 8, line 28, after "to" insert --utilize--

SIGNED AND
SEALED
JUL 7 1970

(SEAL)
Attest:

Edward M. Fletcher, Jr.
Attesting Officer

WILLIAM E. SCHUYLER, JR.
Commissioner of Patents